(12) United States Patent
Müller

(10) Patent No.: US 7,489,425 B2
(45) Date of Patent: Feb. 10, 2009

(54) METHOD FOR CONTROLLING AN OPERATING PROCESS OF A PRINTING MACHINE

(75) Inventor: Tobias Müller, Hirschberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 777 days.

(21) Appl. No.: 11/048,321

(22) Filed: Feb. 1, 2005

(65) Prior Publication Data

US 2005/0200918 A1  Sep. 15, 2005

(30) Foreign Application Priority Data

Mar. 15, 2004 (DE) .................... 10 2004 012 466

(51) Int. Cl.
*H04N 1/04* (2006.01)
(52) U.S. Cl. .................. 358/496; 358/488; 358/475; 382/154
(58) Field of Classification Search .......... 358/2.1, 358/449, 488, 496, 494, 474, 475; 356/3.15, 356/364, 369; 399/370, 376; 382/104, 190, 382/209, 294, 305, 154, 155, 159
See application file for complete search history.

(56) References Cited

U.S. PATENT DOCUMENTS

| | | | |
|---|---|---|---|
| 4,025,201 A * | 5/1977 | Deane ................... 356/239.4 |
| 4,825,091 A | 4/1989 | Breyer et al. |
| 5,786,909 A * | 7/1998 | Miyawaki et al. ........... 358/527 |
| 6,050,192 A | 4/2000 | Kipphan et al. |
| 6,058,201 A | 5/2000 | Sikes et al. |
| 6,119,594 A | 9/2000 | Kipphan et al. |
| 6,301,382 B1 * | 10/2001 | Smith et al. ................. 382/162 |
| 6,354,507 B1 * | 3/2002 | Maeda et al. ............... 235/494 |
| 6,661,453 B1 * | 12/2003 | Numazaki et al. ........ 348/227.1 |
| 6,965,460 B1 * | 11/2005 | Gann et al. ................. 358/474 |
| 7,016,525 B2 * | 3/2006 | Gladnick .................... 382/141 |
| 7,031,496 B2 * | 4/2006 | Shimano et al. ............ 382/104 |
| 7,039,228 B1 * | 5/2006 | Pattikonda et al. ......... 382/145 |
| 7,072,081 B2 * | 7/2006 | Johnson et al. ............ 358/474 |
| 2002/0001398 A1 * | 1/2002 | Shimano et al. ............ 382/154 |
| 2002/0033973 A1 * | 3/2002 | Dolan et al. ................ 358/449 |

(Continued)

FOREIGN PATENT DOCUMENTS

DE         37 03 422 A1      8/1988

(Continued)

*Primary Examiner*—Kimberly A Williams
(74) *Attorney, Agent, or Firm*—Laurence A. Greenberg; Werner H. Stemer; Ralph E. Locher

(57) ABSTRACT

A method for controlling an operating process of a printing machine uses parameters of 3-D scenes taken with only one camera. A learning phase is performed in which the object in a non-moving state and its surroundings are illuminated from different directions by different fixed-location light sources, one after another. For each illumination scene, image signals reproducing the object and its surroundings are obtained with the image recording device. The image signals are processed and an unambiguous association between object edges and object shadows in relation to a light source in each case are determined and stored. In an operating phase, the moving object and its surroundings are illuminated simultaneously by a plurality of light sources, and, from the data stored in the learning phase and the image signals obtained continuously in the operating phase, the position of the object in space is determined.

6 Claims, 2 Drawing Sheets

U.S. PATENT DOCUMENTS

| | | |
|---|---|---|
| 2002/0080411 A1* | 6/2002 | Perry .................... 358/400 |
| 2003/0223083 A1* | 12/2003 | Geng .................... 356/603 |
| 2004/0177783 A1 | 9/2004 | Seymour |
| 2007/0035539 A1* | 2/2007 | Matsumura et al. ......... 345/419 |
| 2007/0206836 A1* | 9/2007 | Yoon et al. .............. 382/104 |
| 2008/0075324 A1* | 3/2008 | Sato et al. .............. 382/154 |

FOREIGN PATENT DOCUMENTS

| | | |
|---|---|---|
| DE | 42 02 723 A1 | 9/1992 |
| DE | 43 21 179 A1 | 1/1995 |
| DE | 196 36 354 A1 | 3/1998 |
| DE | 197 07 417 A1 | 8/1998 |
| DE | 199 14 962 A1 | 10/2000 |
| DE | 696 16 644 T2 | 11/2001 |
| DE | 200118145 U1 | 1/2002 |
| DE | 201 18 145 U1 | 3/2002 |
| DE | 103 01 636 A1 | 9/2003 |
| DE | 102 22 797 A1 | 12/2003 |
| EP | 1 134 594 A1 | 9/2001 |
| EP | 1 457 335 A1 | 9/2004 |
| GB | 2 254 448 A | 10/1992 |
| GB | 2 264 601 A | 9/1993 |

* cited by examiner

METHOD FOR CONTROLLING AN OPERATING PROCESS OF A PRINTING MACHINE

BACKGROUND OF THE INVENTION

Field of the Invention

The invention relates to a method for controlling an operating process of a printing machine. In such methods positional signals of a movable object are obtained with an image recording device, and the positional signals are processed in order to influence the operating process as desired.

The invention makes it possible to automate a paper-processing machine, in which specific state parameters that are present in a 3-D scene are acquired by use of a camera and image processing. The acquisition of the state parameters can be implemented visually by a machine operator. In this case, the visual system of the human with his capability of three-dimensional perception, in particular as a result of stereoscopic vision, is helpful. The machine operator is able to assume various positions one after another with his head in order to obtain a comprehensive 3-D impression.

In order to monitor the paper run on a press, published, non-prosecuted German patent application DE 43 21 179 A1, corresponding to U.S. Pat. No. 6,050,192 and U.S. Pat. No. 6,119,594, discloses the use of cameras, which generate two-dimensional image data of the printed image and of the printing material. By using the image data, the relative position of part images in relation to one another, the position of a printed image in relation to the printing material edges, and the position of the printing material relative to elements of a conveying apparatus can be determined.

In the method for setting a press according to published, non-prosecuted German patent application DE 42 02 723 A1, corresponding to published British patent application GB 2 254 448 A, adjustment functions are carried out on the basis of camera signals. The camera signals contain information relating to the presence and the position of a machine element.

In published, non-prosecuted German patent application DE 103 01 636 A1, a configuration for detecting features of a sheet stack or sheet is described, in which two edges of a sheet stack are registered simultaneously with a camera and with an image data processing unit.

In all of the methods previously mention, use is always made of a light source and a camera in order to determine two-dimensionally the position and size of objects. The processing of 2-D images is inadequate because of the low information content.

It is also known, with the aid of surveying cameras, to record an object, such as a building or a landscape, from at least two locations. 3-D object coordinates can be determined point by point from the image coordinates. In the case of photogrammetric recording with the cameras, information can be obtained from the shadow of the object and can be processed.

In the method according to published, non-prosecuted German patent application DE 196 36 354 A1, by using adjustable optical devices for the illumination of an object, 3-D surveying is made possible. Using a first radiation source, a pattern is projected onto the surface to be surveyed. If the projection angle is different from the recording angle of a camera, 3-D information can be calculated from the image of the pattern on an image converter. Using the second radiation source, the surface is alternatingly illuminated completely.

SUMMARY OF THE INVENTION

It is accordingly an object of the invention to provide a method for controlling an operating process of a printing machine which overcomes the above-mentioned disadvantages of the prior art methods of this general type, which, with little effort and low cost, permits parameters of a 3-D scene to be obtained with only one camera, by using which the operating processes are controlled.

With the foregoing and other objects in view there is provided, in accordance with the invention, a method for controlling an operating process of a printing machine. The method includes the performance of a learning phase by illuminating a movable object in a non-moving state and its surroundings from different directions successively by different fixed-location light sources. First image signals reproducing the movable object and the surroundings with an image recording device are obtained for each illumination scene. The first image signals are processed for determining an unambiguous association between object edges and object shadows in relation to a respective light source resulting in learning signals. The learning signals are then stored. Next, an operating phase is performed by illuminating the movable object during a moving state and the surroundings simultaneously by the different fixed-location light sources. Second image signals reproducing the movable object and the surroundings are obtained by the image recording device. From the learning signals stored during the learning phase and the second image signals obtained continuously in the operating phase, a position of the movable object in space is obtained.

The position of the movable object is used to influence the operating process as needed.

According to the invention, first a 3-D scene of the machine in the static state is illuminated successively by various light sources and the respective associated image is recorded with a camera. The light sources are advantageously chosen such that they differ considerably in spectrum and/or in directional characteristics and are disposed at different locations. The edges and shadows of an object belonging to the 3-D scene that are visible in the image are assigned unambiguously to a light source and its position. In this phase, the association is taught to an image processing system.

In the subsequent operation of the machine, with a moving object, simultaneous illumination of the scene with a plurality of light sources and continuous image recording with the camera are carried out. An image that is now recorded contains the superimposition of the previously learned parameters. On the basis of the various shadows of the object in the scene, the actual location of the object can be calculated.

It is possible to use light sources with colored light, with invisible IR or UV light and/or light sources with polarized light. Furthermore, additional selective information can be obtained from the type of incidence of light. In particular, the incidence of light can be provided so as to be diffuse, directed, parallel or structured. The camera used is a multi-channel camera, such as an RGB color camera, a color camera with special channels, in particular IR channels, and/or a camera with polarization filters. The configuration containing light sources and camera is made in accordance with the scene and the object to be detected.

The method steps can be carried out once in the learning phase for the purpose of installation of the system or else repeated cyclically during continuous operation, by reference objects of known size and arrangement being used.

The advantages of the method according to the invention reside in the fact that the desired information is contained in only one image. Only one camera is needed in order to obtain 3-D information relating to an object. Given only one image recording, use in fast-moving processes is possible.

Other features which are considered as characteristic for the invention are set forth in the appended claims.

Although the invention is illustrated and described herein as embodied in a method for controlling an operating process of a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
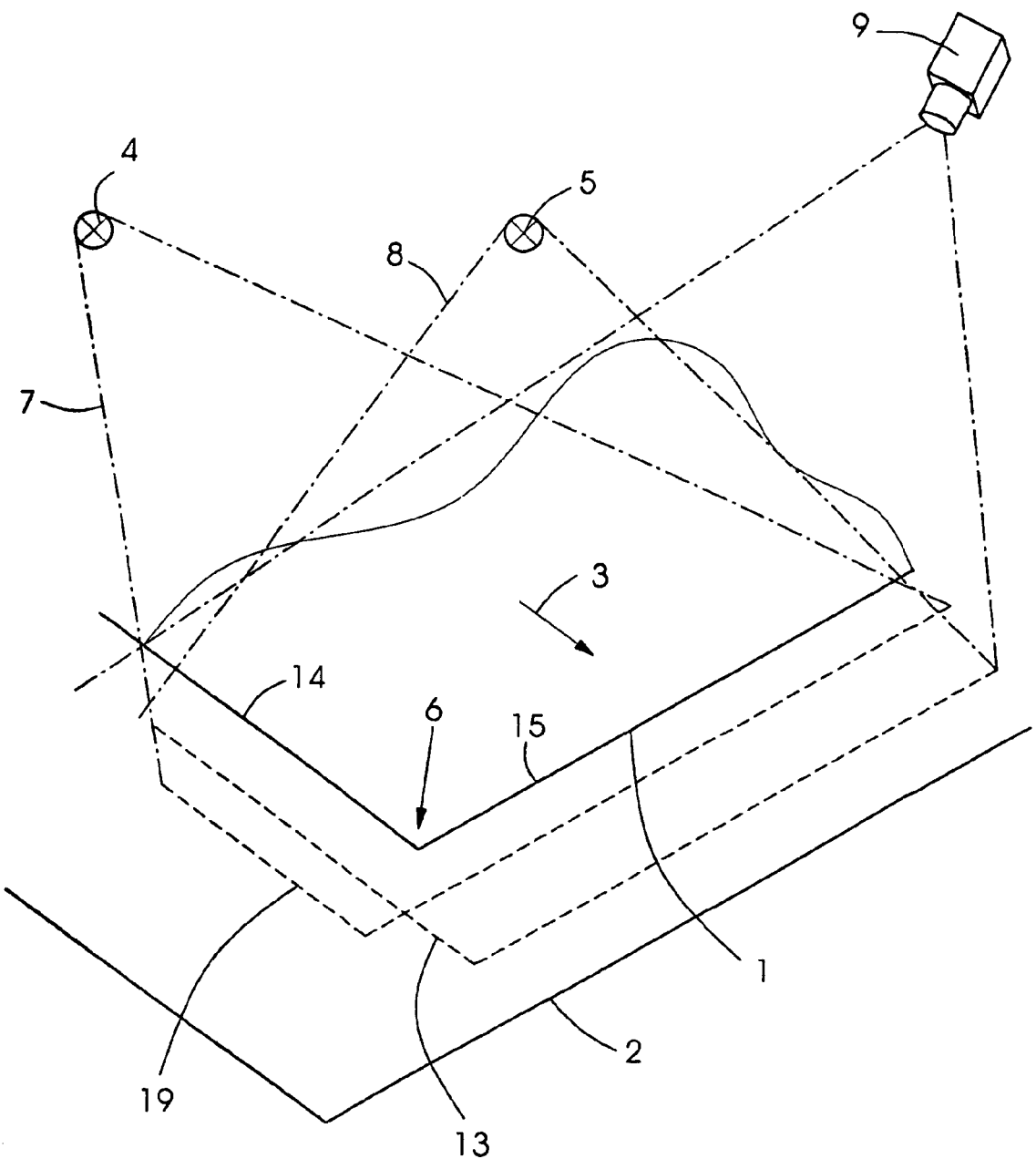
FIG. 1 is a schematic diagram of a configuration for implementing a method for controlling a press during a sheet transport process according to the invention.

Referring now to the figures of the drawing in detail and first, particularly, to FIG. 1 thereof, there is shown a scene during a conveyance of a sheet 1 in a press. The sheet 1 is moved in a direction 3 over a sheet guide plate 2 without contact by a conveying apparatus during printing. Disposed along the conveying path, above the sheet 1, are two light sources 4, 5, whose lights illuminate a corner 6 of the sheet and its surroundings. The light sources 4, 5 are disposed permanently at different locations and produce light beams 7, 8 of different wavelengths. In order to record an image of the scene, a color camera 9 is disposed permanently at a location different from the light sources 4, 5.

Figure 2:
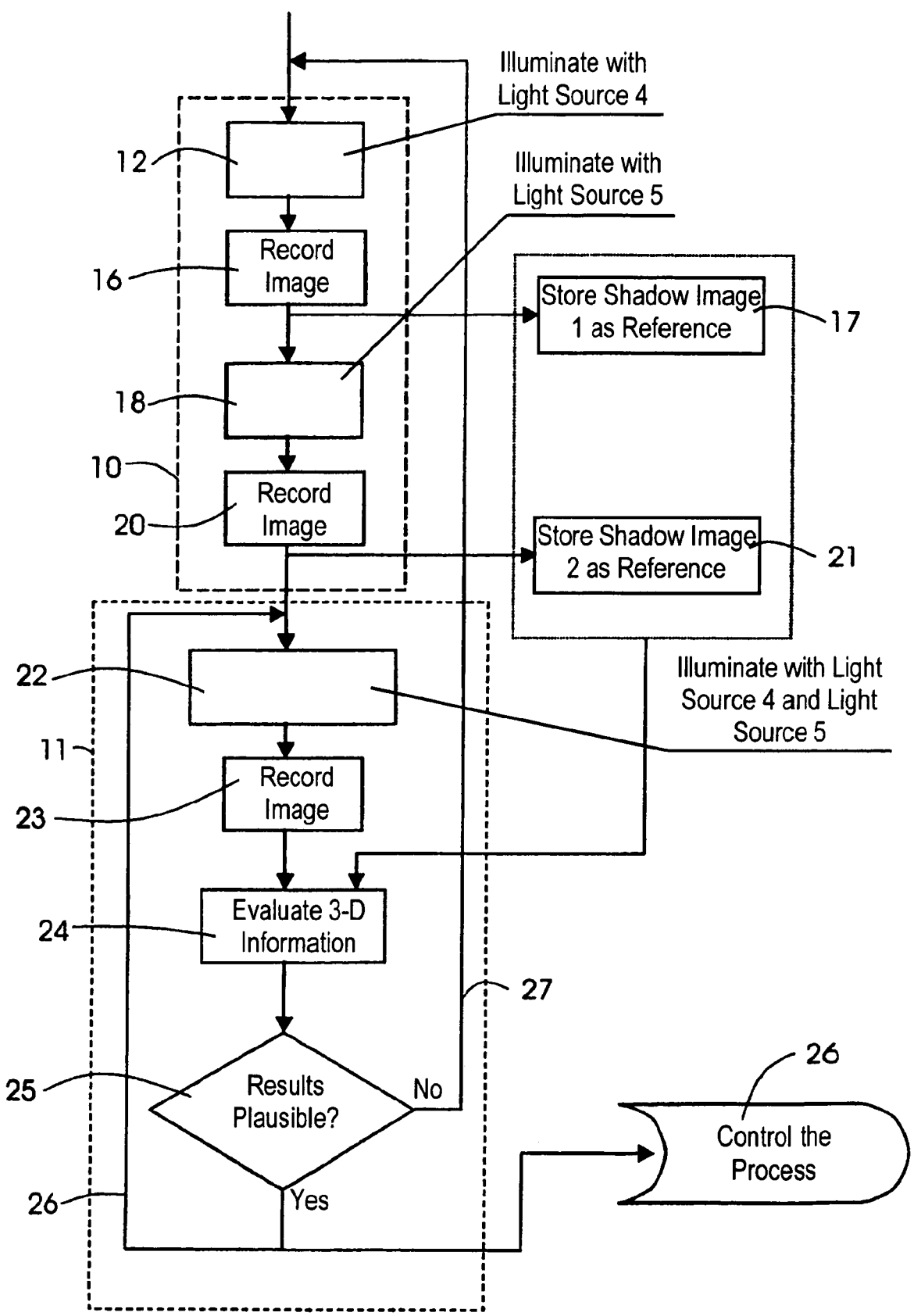
FIG. 2 is a flow chart relating to the implementation of the method.

In the following text, the implementation of the method will be described by using FIG. 2. The method steps are divided into a learning phase 10 and into an operating phase 11, which are in each case outlined by dashed lines in FIG. 2.

In the learning phase 10, for the purpose of teaching, a sheet 1 is moved over the sheet guide plate 2 into a position that corresponds to a position desired during the operation of the press. The non-moving sheet 1 is exposed to the light beams 7 from the light source 4 at the sheet corner 6 in step 12. On the sheet guide plate 2 lying under the sheet 1, a shadow 13 having the contours of the sheet edges 14, 15 is produced. In further step 16, by using the color camera 9, an image is recorded and the image of the shadow 13 is stored as a reference in step 17. After that, in step 18, the light source 4 is switched off and the light source 5 is switched on. The light beams 8 gives rise to a further shadow 19 of the sheet corner 6 on the sheet guide plate 2. In step 20, again using the color camera 9, an image is recorded and the image of the shadow 19 is stored as a reference in step 21. This completes the learning phase 10.

In the operating phase 11, sheets 1 are conveyed individually one after another over the sheet guide plate 2. In step 22, in each case during the movement of the sheet 1, the sheet corner 6 is illuminated by both light sources 4, 5. By the light beams 7, 8, the shadows 13, 19 are produced simultaneously. At a time derived from the conveying path of the sheets 1, the recording of an image is performed by the color camera 9 in step 23. Then, in step 24, 3-D information relating to the position of the sheet in space is obtained from the image and is evaluated. In this case, the shadow images stored in the steps 17, 21 are processed as a priori knowledge. In step 25, the 3-D information is checked for plausibility. If plausibility is provided, the 3-D information is used in order to influence the position of the sheet 1 as desired in step 26. The conveyance of sheets 1 and the successive illumination with the light sources 4, 5 can be continued, which is symbolized in the flow chart by feedback 26 to the step 22. If the 3-D information is not plausible, then it is not used for controlling an operating process of the press; instead the 3-D information has to be generated again via the learning phase 10, which is symbolized by the feedback 27 to step 12.

The use of the method during the conveyance of sheets in a press has been explained only by way of example. The method is used to control any operating processes by using 3-D information, such as during sheet separation, sheet feeding and delivery or register control. The invention can likewise be applied in web-processing machines.

This application claims the priority, under 35 U.S.C. § 119, of German patent application No. 10 2004 012 466.3, filed Mar. 15, 2004; the entire disclosure of the prior application is herewith incorporated by reference.

I claim:

1. A method for controlling an operating process of a printing machine, which comprises the steps of:
   performing a learning phase by the steps of:
      illuminating a movable object in a non-moving state and its surroundings from different directions successively by different fixed-location light sources;
      obtaining first image signals reproducing the movable object and the surroundings with an image recording device for each illumination scene;
      processing the first image signals for determining an unambiguous association between object edges and object shadows in relation to a respective light source resulting in learning signals; and
      storing the learning signals;
   performing an operating phase by the steps of:
      illuminating the movable object during a moving state and the surroundings simultaneously by the different fixed-location light sources;
      obtaining second image signals reproducing the movable object and the surroundings with the image recording device;
      determining from the learning signals stored during the learning phase and the second image signals obtained continuously in the operating phase, a position of the movable object in space; and
      processing the position of the movable object to influence the operating process as needed.

2. The method according to claim 1, which further comprises selecting the light sources used to have different spectral emissions.

3. The method according to claim 1, which further comprises selecting the light sources used to differ in characteristics of their three-dimensional propagation of light.

4. The method according to claim 1, which further comprises selecting the light sources used to differ in a polarization direction of light emitted.

5. The method according to claim 1, which further comprises selecting the image recording device to have spectral sensitivity.

6. The method according to claim 1, which further comprises selecting the image recording device to have a sensitivity to light of a defined polarization direction.

* * * * *